United States Patent [19]

Brunner

[11] Patent Number: 5,332,020
[45] Date of Patent: Jul. 26, 1994

[54] TIRE CHANGING APPARATUS

[76] Inventor: Larry F. Brunner, R.R. 2, Box 77, Springfield, Vt. 05156

[21] Appl. No.: 972,148

[22] Filed: Nov. 5, 1992

[51] Int. Cl.$^5$ .............................................. B60B 30/00
[52] U.S. Cl. .......................................... 157/14; 157/21
[58] Field of Search ........................... 157/14, 16-18, 157/20-21, 1.17, 1.22, 1.24, 1.26, 1.28; 411/386, 435, 427

[56] References Cited

U.S. PATENT DOCUMENTS

| | | | |
|---|---|---|---|
| 975,011 | 11/1910 | Armstrong | 411/136 |
| 1,008,157 | 11/1911 | Joy . | |
| 1,650,325 | 11/1927 | Clement . | |
| 2,693,228 | 11/1954 | Rockwell | 157/1.24 |
| 3,463,208 | 8/1969 | Turpin | 157/18 |
| 3,552,257 | 1/1971 | Tanabe | 411/435 X |
| 3,823,756 | 7/1974 | Rainey | 157/1.3 |
| 3,867,975 | 3/1975 | Johnson | 157/1.2 |
| 4,118,989 | 10/1978 | Wood | 157/14 X |
| 4,229,265 | 11/1981 | Alm | 157/1.1 |
| 4,433,578 | 2/1984 | Hill | 73/487 |
| 4,461,335 | 7/1984 | Beemer | 157/1.22 |
| 4,840,215 | 6/1989 | Vijay et al. | 157/20 X |

Primary Examiner—D. S. Meislin
Attorney, Agent, or Firm—Michael J. Weins

[57] ABSTRACT

This invention is a tire-changing device which is used for engaging then stripping the tire from rims of wheels. The device is used in combination with a workbench and stores under the bench when not in use. A threaded rod is raised above the bench top when the tire changer is in use. Mobility for the threaded rod is provided by having it slidably engage a sleeve which, in turn, is coupled to the bench. A friction pad is employed which rests on the bench and through which the threaded rod passes. A restraining hub through which the rod passes engages the hub of the wheel. A torque nut holds the hub firmly in place, thereby securing the wheel between the restraining hub and the friction pad. A double headed tool is provided which engages the rim of the tire. A first head is contoured to assist in engaging the bead of the tire to the rim and a second head is for the purpose of stripping the tire from the rim.

12 Claims, 8 Drawing Sheets

TIRE CHANGING APPARATUS

FIELD OF THE INVENTION

The present invention relates to a tire changing system, and more particularly to a tire changing stand and tool.

BACKGROUND OF THE INVENTION

There have been a variety of tire changing stands which mount on a bench or other structures such as those taught in U.S. Pat. No. 2,693,228 and U.S. Pat. No. 3,867,975. The stand of the '975 patent is affixed to the top of the bench by bolts or other attaching means while the stand of the '228 patent is bolted to the floor. These stands occupy work space on either the bench or the floor, space which cannot be utilized when the tire changer is not being used.

The stand of the '228 patent also teaches the use of a conical wheel hub engaging element however, the design of this element is such that, if used for a bearing containing wheel hub, the bearings may be damaged by the pressure applied by the conical element. Other patents, such as U.S. Pat. No. 4,299,265 and U.S. Pat. No. 4,433,578 also employ a conical hub engaging means but again, suffer from the same limitation on bearing containing hubs.

With regard to tire changing tools for use with stands, there have been tire mounting tool tips designed to engage tires on rims and remove tires from rims. These tools generally divide into tools for stripping and tools for engaging the tire with the rim. Two of the tools of yesteryear that were used for tire changing are U.S. Pat. No. 1,008,157 and U.S. Pat. No. 1,650,325. Both of these patents teach tool tip configurations which appear to be designed for rims with snap rings for yesteryear's tires, which are removed in the process of removing the tire. These tips have corners that could rip a tube housed within the tire if the tool were used to strip tires with tubes and would not be suited for the tires and rims of today.

U.S. Pat. No. 3,823,756 teaches a double groove tire mounting tool. One groove serves to engage the rim edge while the other groove engages the tire cord. The difficulty with this tip is that the groove engaging the rim is straight, resulting in a gap between the rim and the tool which can pinch and rip the bead of the tire while engaging the tire with the rim of the wheel. As the size of the rim decreases, this gap grows making it more likely that the beads on small tires will be damaged.

Thus, there is a need for a tire changing system which can be used in combination with a bench and does not reduce the use of the bench surface when the tire changing system is not in use. There is also a need for a tire changing tool which will provide a tip for effective stripping and engaging of tires without endangering a tube contained therein or damaging the rim engaging bead of the tire.

SUMMARY OF THE INVENTION

It is an object of the invention to provide a tire changing device which is mounted to a bench and which can be retracted below the bench top when it is not in use.

It is another object of the invention to provide a tire charging device which can be stored without reducing the floor space or bench work area.

It is another object of the invention to provide a tire changer which will secure rims without lug holes therethrough.

It is still another object of the invention to provide a tire changer for spoke wheels or other wheels where the hub extends beyond the plane of the rim.

It is another object of the invention to provide a tire changer which can secure rims with extended hubs having bearings contained therein.

It is yet another object of the invention to provide a tool to be used in changing tires which can effectively strip a tire from a rim while substantially reducing the likelihood of damage to a tube contained therein and which greatly enhances the speed and efficiency of tire changing.

It is still another object of the invention to provide a tire changing tool which is used for engaging a tire with the rim which reduces the likelihood that the tire bead will be damaged.

These and other objects of the invention will become apparent from the following description, figures, and claims.

The present invention relates to a tire changing device which attaches to and is used in combination with a bench having a bench top. The tire changing device has a threaded shaft which can raise above the bench top to position and hold a rim of a wheel from which a tire is to be stripped. The threaded shaft is so mounted that it can be lowered below the bench top when not in use.

In its simplest form, the tire changing device has a threaded rod which slidably engages a sleeve. The threaded rod can be moved from a position below the bench top to a position where part of the threaded rod protrudes above the bench top.

Means for attaching the sleeve to the bench are provided. Preferably one or more brackets are provided to attach the sleeve to either the bench top or, if the bench is supported by legs, to the legs of the bench.

Means for positioning and locking the threaded rod with respect to the sleeve are provided such that a portion of the threaded rod is positioned above the bench top. A locking pin can serve as a simple means for positioning and locking the threaded rod with respect to the sleeve. In this case, a threaded rod passage is provided passing through the threaded rod and a pair of holes is provided in the sleeve. The sleeve holes are positioned so that, when aligned with the threaded rod passage, the pin is passed through the threaded rod and the pair of holes and held in position with part of the rod above the bench top.

In a preferred embodiment, the pin is provided with a stop which prevents disengagement of the pin with the passage of the threaded rod. The pin is disengaged from the sleeve holes by retracting the pin such that a first end of the pin is withdrawn from a first sleeve hole of the pair of sleeve holes, while a second end of the pin is removed from a second sleeve hole of the pair by sliding along a slot provided in the sleeve which connects to the second sleeve hole.

A friction pad is provided which is placed on and is, at least in part, supported by the bench top. The friction pad has a hole through which the threaded rod passes when the friction pad is placed on the bench. It is further preferred that the friction pad have rigid support substrate for application where the friction pad is not fully supported by the bench top.

In a preferred embodiment for use with spoked wheels, the friction pad is of variable thickness and provided with a contour such that the spokes of the wheel will be engaged by the pad. A variable thickness pad is also preferably employed where the hub extends beyond the plane of the rim.

A hub restrainer is provided through which the threaded rod passes. It is preferred that the restrainer have an outer conical surface and an inner conical surface which are axially aligned and spaced apart forming a hollow element which is a frustum of a cone. The outer conical surface is employed to engage the passage through the hub for bearingless hubs, while the inner surface is employed to engage the extended hub of the rims which contain bearings.

A torque nut is provided which engages the threaded rod and holds down the hub restrainer. It should be appreciated that the torque nut and the hub restrainer could be an integral unit. While they may be an integral unit, it is preferred that the hub and torque nut be separate. It is further preferred that a spacer element through which the threaded rod passes be interposed between the torque nut and the hub restrainer. The spacer element protects the threads of the threaded rod and increases the bending moment of the threaded rod when a tire tool is pivoted about the spacer element.

A tire tool has been designed which is preferred for use in combination with the tire changer described above. The tool, in its simplest form, has a shaft with a central axis and a first and second end.

A tire engaging head attaches to the first end of the shaft and is offset from the shaft. The tire engaging head has a rim engaging lip which is substantially normal to the central axis of the shaft. It is further preferred that the rim engaging lip have a radius of curvature that is selected such that the rim engaging lip will have substantial contact with the rim.

A bead engaging groove is also provided to the tire engaging head and is substantially parallel to the rim engaging lip. The bead engaging groove decreases in cross section as the groove distance from the shaft increases. The bead engaging groove has a path which provides a gradual slope toward the rim engaging lip directing the bead of the tire toward the rim as the bead moves away from the shaft.

A tire stripping head is attached to the second end of the shaft. The tire stripping head has a tire stripping tip and a tire stripping body.

The tire stripping body has a thickness T. This thickness is greater than the thickness t of the tire stripping tip. This difference in thickness produces a rim engaging step at the junction between the tire stripping body and the tire stripping tip. This step limits the projection of the tip of the stripping tip into the tire, as it is biased around the rim, thereby reducing the likelihood of damage to a tube contained in the tire. The step preferably has a riser which is concave when viewed from the shaft. This curved surface facilitates rocking of the step on the rim and aids in the advancement of the stripping tip.

The tire stripping tip has a first section and a second section, both of these sections having the same thickness. The second section connects to the tire stripping body and the first section attaches to the second section, terminating in a smooth curved surface. The first section and the second section offset such that they have an included angle $\beta$ of between about 140° and 160°. The offset is such that the tip tilts away from the step.

BRIEF DESCRIPTION OF THE DRAWINGS

As illustrated in FIG. 3, the threaded rod is positioned so as to pass by the end of the bench, thereby avoiding the necessity of cutting a hole in the bench.

DESCRIPTION OF THE PREFERRED EMBODIMENTS

Figure 1:
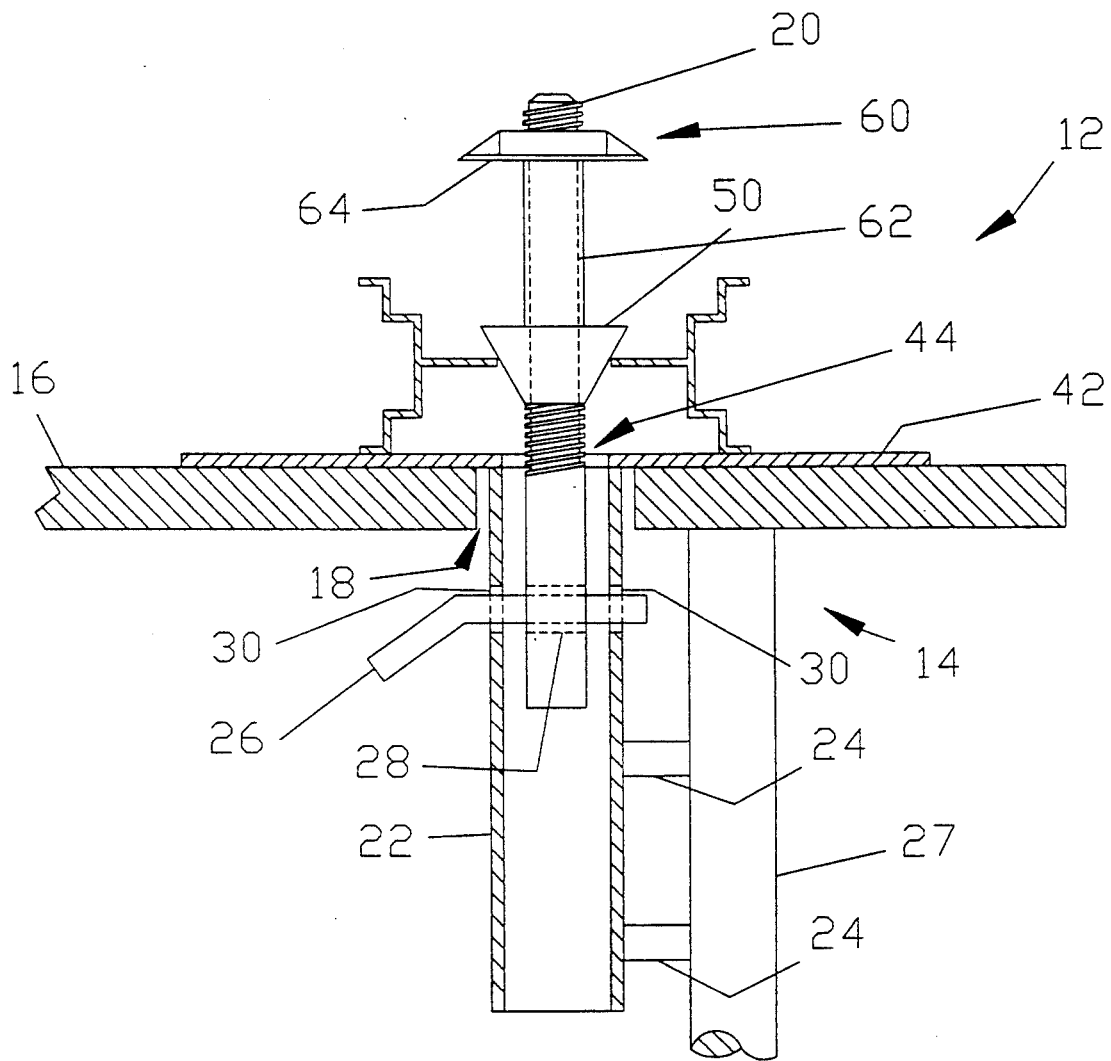
FIG. 1 illustrates one embodiment of the invention where the tire changer of the present invention is being used to hold a bearingless rim. In this embodiment, a removable retaining pin is employed to position and lock the threaded rod with respect to the sleeve which the threaded rod slidably engages.

FIG. 1 illustrates one embodiment of the tire changing device 12 of the present invention. The tire changing device 12 is used in combination with a bench 14 having a bench top 16. The tire changing device 12, as mounted in FIG. 1, requires that a passage 18 be provided in the bench top 16. The tire changing device 12 has a threaded rod 20 which passes through the passage 18. The threaded rod 20 is raised above the bench top 16 when in use and is lowered below the bench top 16 when the tire changing device 12 is not being used. Having the threaded rod 20 stored beneath the bench top 16 allows for storage of the tire changing device 12 without the loss of bench top area or floor space.

The tire changing device 12, in its simplest form, has a sleeve 22 which slidably engages the threaded rod 20. The threaded rod 20 is movable from a position below the bench top 16 to a position where a portion of the threaded rod 20 protrudes above the bench top 16.

Means for attaching the sleeve 22 to the bench 14 are provided. Preferably one or more brackets 24 are provided for attaching the sleeve 22 to either the bench top 16 or, as shown in FIG. 1, to a leg 27 which supports the bench top 16.

Means for positioning and locking the threaded rod 20 with respect to the sleeve 22 are provided. For the embodiment of FIG. 1, a removable pin 26 is employed which engages both the sleeve 22 and the threaded rod 20. The pin 26 passes through a threaded rod passage 28 and a pair of sleeve holes 30 so positioned that they can be aligned with the threaded rod passage 28.

Figure 2:
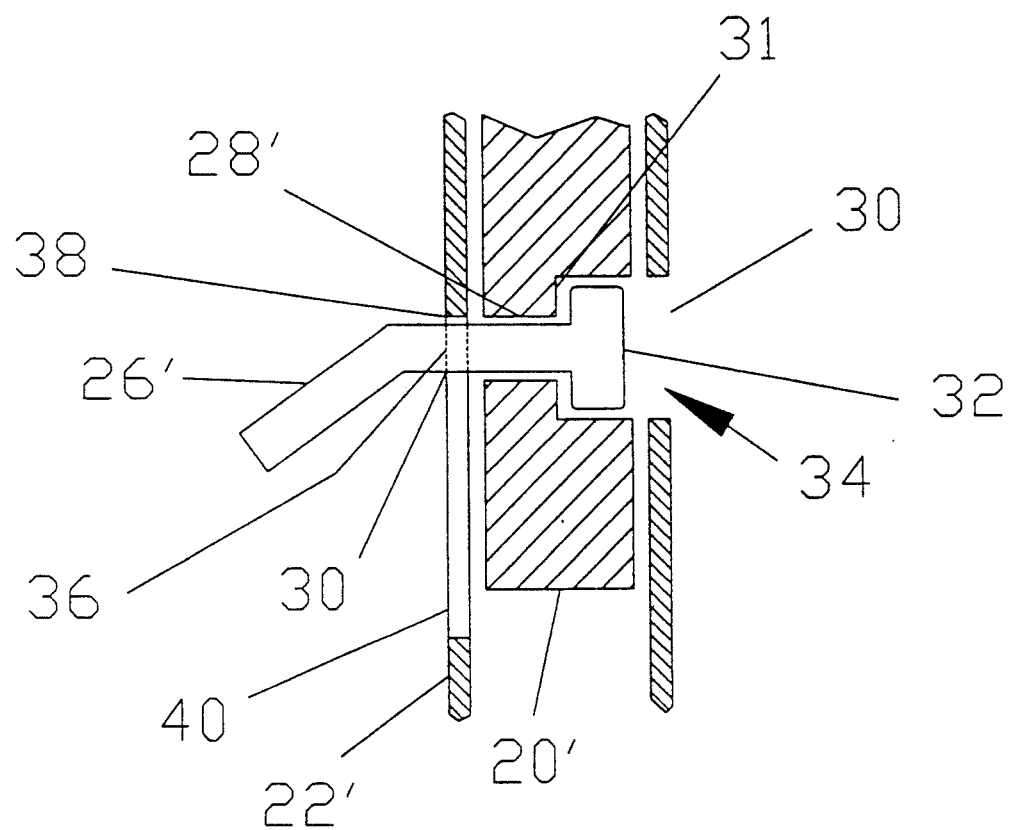
FIG. 2 is a view of a preferred embodiment of the present invention showing a section of the sleeve and the threaded rod in cross section. This embodiment employs a retaining pin which has a stop to prevent removal of the pin from the threaded rod. The retaining pin slidably engages a track in the sleeve providing mobility to the threaded rod.

FIG. 2 illustrates a preferred embodiment where the pin 26', which slidably engages the threaded rod passage 28', is provided with a stop 31, which prevents the pin 26' from being removed from of the threaded rod passage 28'. The pin 26', when engaged with the sleeve holes 30, can be disengaged from the sleeve holes 30 by pulling the pin 26' so that a first pin end 32 of the pin 26' is retracted into the threaded rod passage 28' of the threaded rod 20' removing the threaded rod pin 26' from a first sleeve hole 34 of the pair of holes 30. A second pin end 36, of the pin 26', can be removed from a second sleeve hole 38 of the pair of sleeve holes 30 by sliding along a slot 40 provided in the sleeve 22'.

Referring again to FIG. 1, a friction pad 42 is provided, which is, at least in part, supported by the bench top 16. When the friction pad 42 is not in use, it is removed from the bench top 16 and stored. Thus, when the tire changing device 12 is not in use, the entire bench top 16 is useable. While the '228 patent teaches the use of a friction surface, it is not a removable pad and is part of working surface of the stand which is mounted to the floor.

Figure 3:
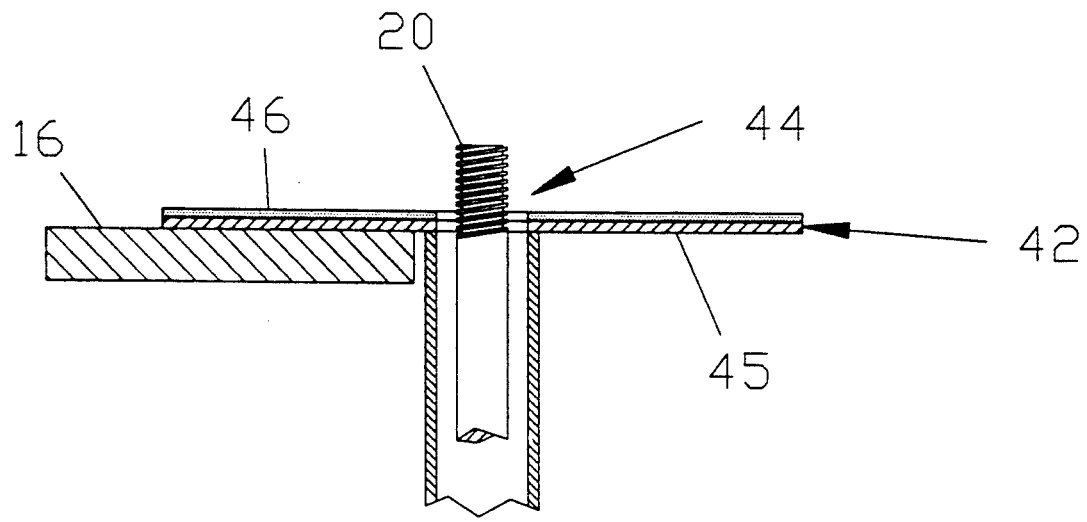
FIG. 3 shows a preferred friction pad which has a rigid member and a resilient section. This embodiment is preferred when there is a substantial overhang between the rim and the bench.

The friction pad 42 has a hole 44 through which the threaded rod 20 passes. In the embodiment of FIG. 3, the friction pad 42 is only partially supported by the bench top 16. In the embodiment of FIG. 3, the threaded rod 20 is positioned such that the threaded rod 20 passes by the end of the bench top 16 and does not require a hole in the bench top 16. When the friction pad 42 is only partially supported, it is further preferred that the friction pad 42 have a rigid support substrate 45 with a resilient surface element 46.

Figure 4:
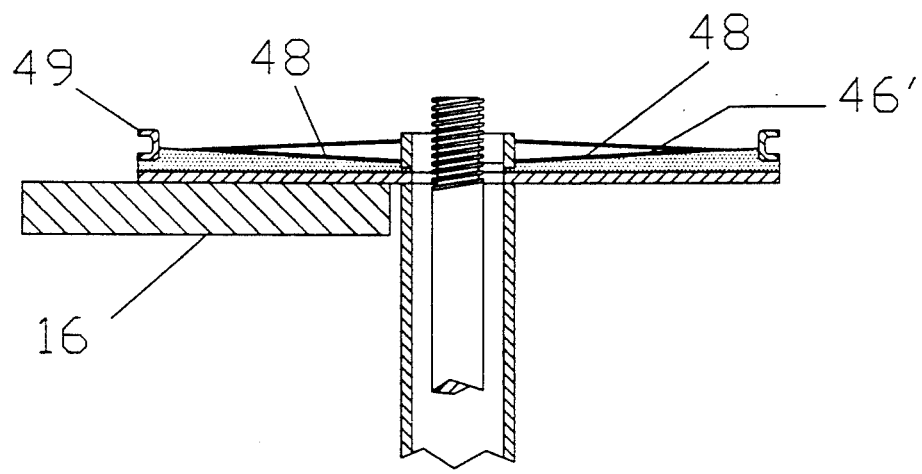
FIG. 4 shows a preferred friction pad having a resilient member with a contoured surface shaped to engage the spokes and rim for the situation where the hub extends beyond the plane of the rim.

When the friction pad 42 is employed for spoke wheels with a hub that extends beyond the plane of the rim, it is further preferred that the resilient surface element 46' be of variable thickness so that it will engage the spokes 48 and the rim 49 as is shown in FIG. 4.

Figure 5:
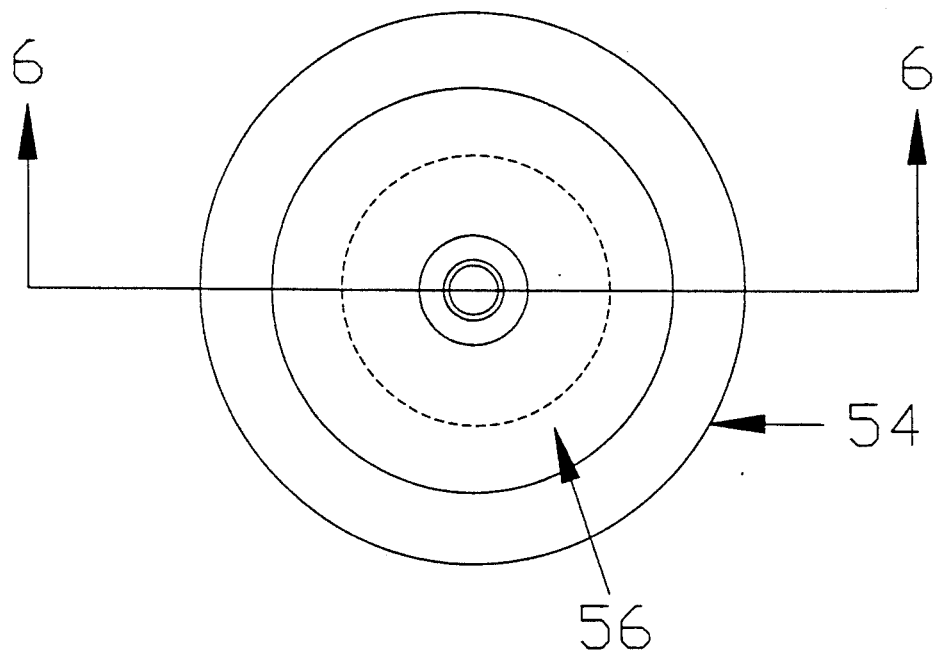
FIG. 5 is a top view of a preferred embodiment of the hub restrainer of the present invention, which has an inner and outer conical surface employed to engage the hub of the rim. As illustrated, the outer conical surface engages the hub of the rim.
Figure 6:
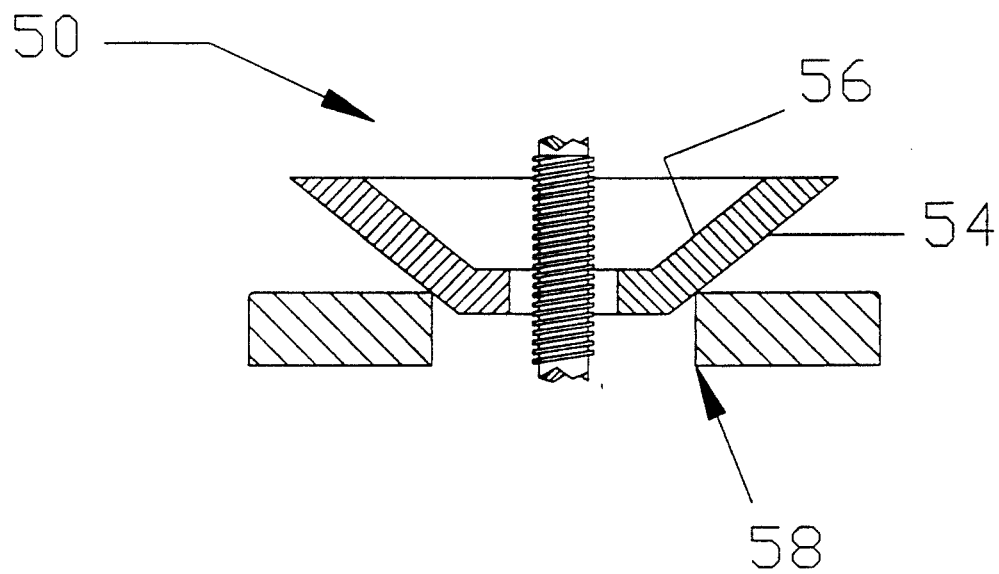
FIG. 6 is the cross section 6—6 of FIG. 5 and shows a hub segment of a wheel which is engaging the outer conical surface of the hub retainer.

A hub restrainer 50, such as shown in FIG. 1, is provided through which the threaded rod 20 passes. It is preferred that the hub restrainer 50 have a pair of conical surfaces as shown in FIG. 5 and 6. An outer conical surface 54 is spaced apart from an inner conical surface 56. These surfaces are axially aligned and form a hollow element which is a frustum of a cone, a cross section of which is shown in FIG. 6. In FIG. 6, the hub restrainer 50 engages a bearingless rim hub 58 with the outer conical surface 54.

Figure 7:
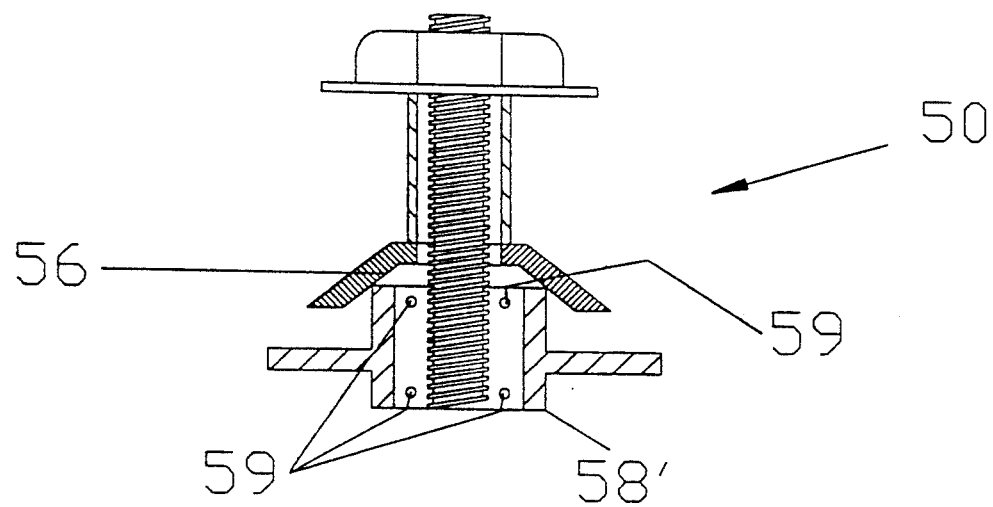
FIG. 7 shows a cross section view of the hub restrainer of FIG. 5 where the inner conical surface is being employed to engage the extended hub of a bearing containing rim.

When the rim has a hub 58' with bearings 59 as is illustrated in FIG. 7, the inner conical surface 56 is used to engage the hub 58'. This assures that the bearing will not be subject to pressure which could cause damage.

Again, referring to FIG. 1, a torque nut 60 is provided which engages the threaded rod 20 and holds the hub restrainer 50 in contact with a rim. It should be appreciated that the torque nut 60 and the hub restrainer 50 could be fabricated as an integral unit. However, it is preferred that a spacer element 62, through which the threaded rod 20 passes, be interposed between the torque nut 60 and the hub restrainer 50. The spacer element 62 reduces the distance through which the torque nut 60 must be turned to maintain the hub restrainer 50 in contact with a rim and also increases the bending moment of the threaded rod 20 which is helpful when engaging or stripping a tire from the rim. This additional strength helps prevent flexing of the threaded rod 20 when it is being used for leverage by a tire stripping and engaging tool. The spacer element 62 also prevents damage of the threads of the threaded rod 20 by eliminating direct contact between the tool and the threads.

The torque nut 60 preferably has a base plate 64 of sufficient weight to aid in "spinning" on and off the threaded rod 20. To facilitate rapid advance of the torque nut 60, it is further preferred that the threads of the torque nut 60 and the threaded shaft be a coarse thread such as an acme thread having approximately 6 threads per inch.

Figure 8:
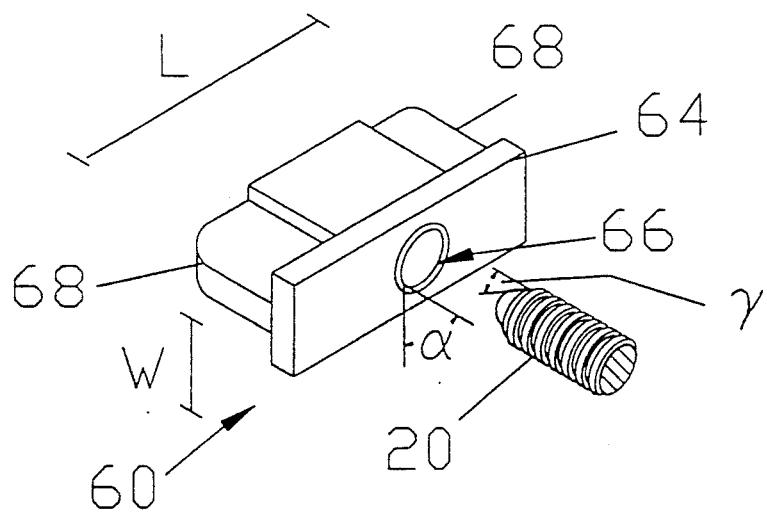
FIG. 8 shows a perspective view of the preferred embodiment of the torque nut as it engages the threaded rod. The width W of the base is limited to facilitate maneuvering the tire changing tool.

As shown in FIG. 8, it is further preferred that a bevel $\alpha$ of about 45° be provided for an opening 66 in the base plate 64 through which the threaded rod 20 passes. This bevel assures ease in engaging the torque nut 60 with the threaded rod 20 which is also provided with a beveled tip with the angle $\gamma$ being about 45°.

It is still further preferred that the torque nut 60 be provided with tabs 68, which can be tapped for tightening or loosening of the torque nut 60.

FIG. 8 shows a preferred shape for the torque nut 60 where the nut has a rectangular shape. The base plate 64 has a width W which is substantially less than the length L. This preferred configuration allows a tire tool, such as the preferred tool described below, to engage with the tire without undo interference from the torque nut. Preferably, the torque nut should have a width approximately equal to the diameter of the spacer element 62.

A tire tool 80 has been designed which is preferred for use in combination with the tire changing device 12 described above and illustrated in the preferred embodiments illustrated in FIGS. 1 through 8.

Figure 9:
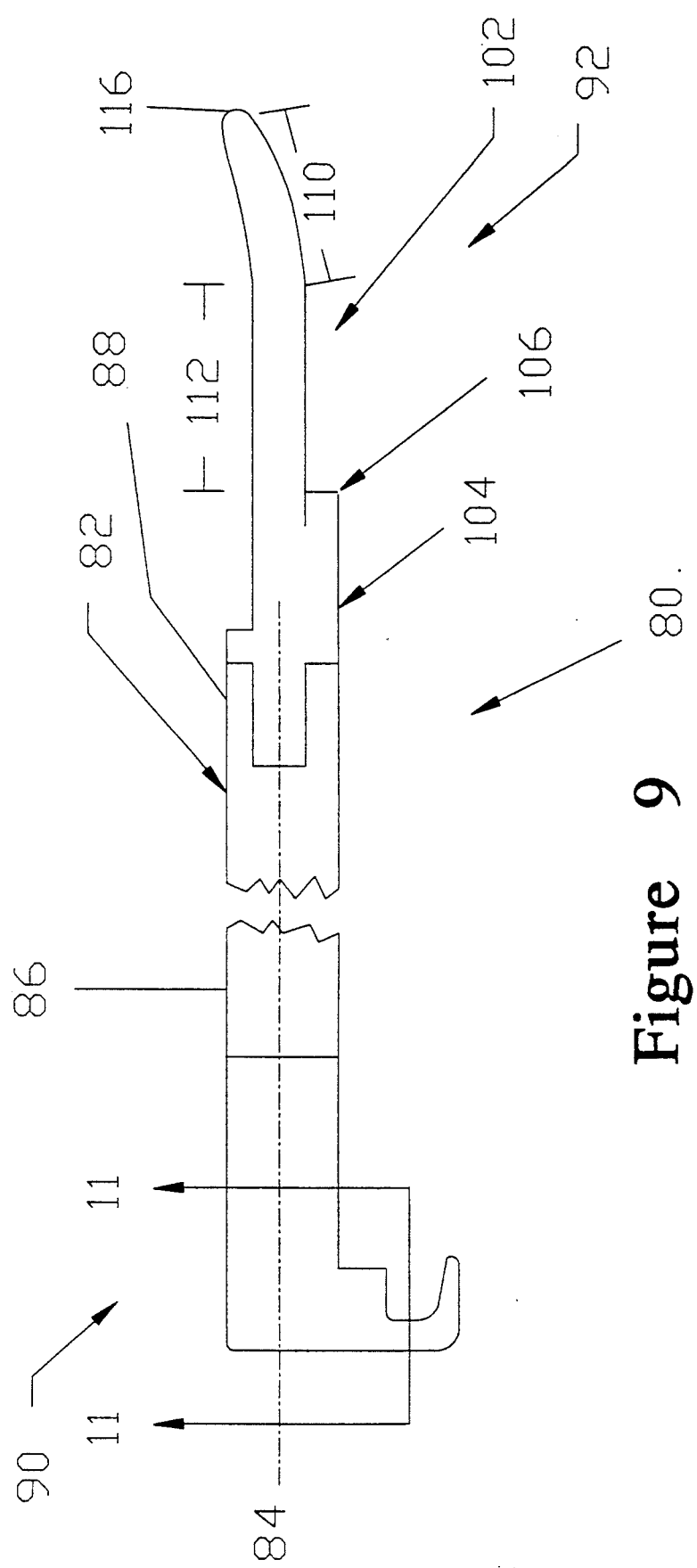
FIG. 9 shows a preferred tool of the present invention for removing and engaging a tire on a rim.

FIG. 9 shows the tool 80, which has a shaft 82 with a central axis 84. The shaft 82 has a first end 86, and a second end 88. A tire engaging head 90 attaches to the first end 86 of the shaft 82. The engaging head 90 is a separate unit which permits the engaging head 90 to be replaced if damaged or rendered inoperable through wear. The separate engaging head 90 also allows the changing of the head 90 with other heads of different proportions making the tool 80 useable on a broader range of rim diameters. Similarly, the second end 88 of the shaft 82 has a tire stripping head 92 which is replaceable.

Figure 10:
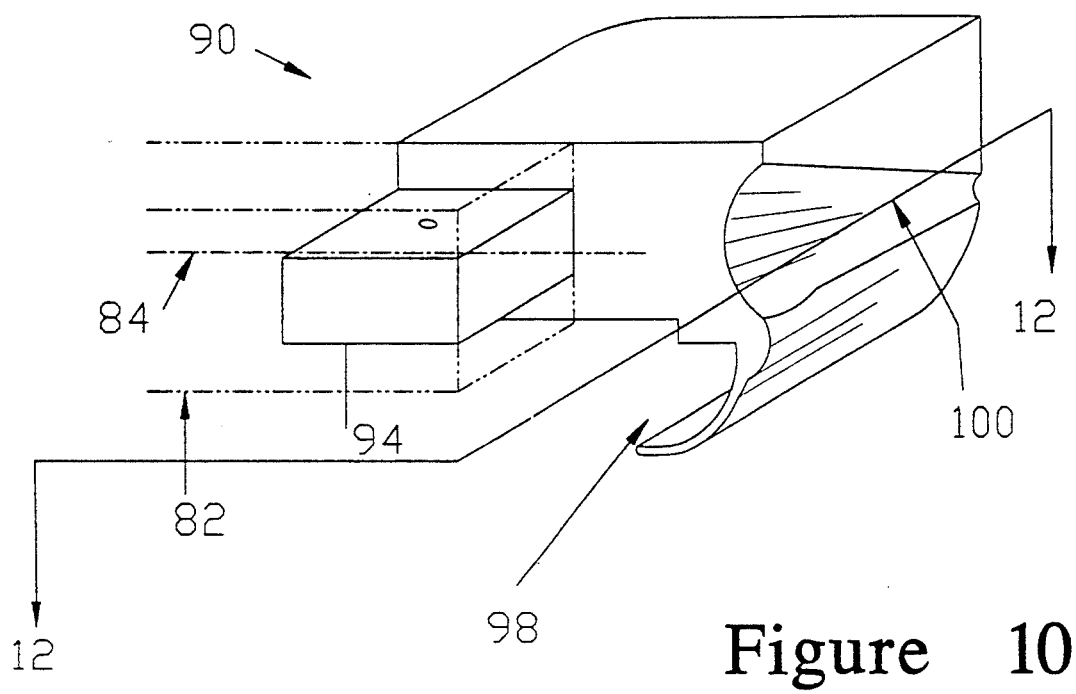
FIG. 10 is a perspective view of the tire engaging head of the tool of FIG. 9.

FIG. 10 shows details of an embodiment of the tire engaging head 90 of the present invention. The tire engaging head 90 has a head engaging tab 94 which is positioned so that the tire engaging head 90 is offset with respect to the shaft 82 of the tool 80.

Figure 11:
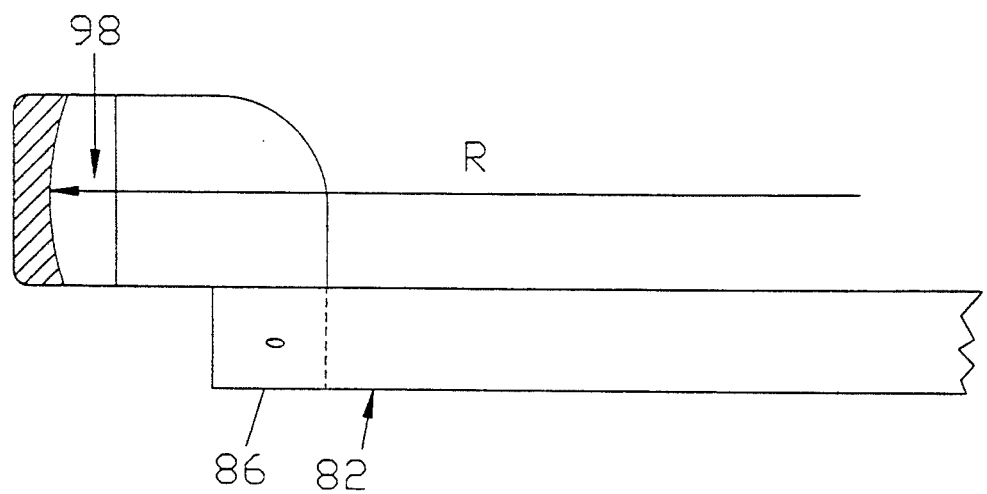
FIG. 11 is the cross section 11—11 of FIG. 9 and shows the curvature of the rim engaging lip.

The tire engaging head 90 has a rim engaging lip 98 which is substantially normal to the shaft 82. While the rim engaging lip 98 is substantially normal to the central axis 84 of the shaft 82, the rim engaging lip 98 has a radius of curvature R as shown in FIG. 11. This radius is selected to be substantially the same as the radius of the rim. Having the radius of the rim of the wheel and the radius of the curvature R for the rim engaging lip 98 equal will eliminate any gap between the rim and the engaging head 90 which could result in damage to the bead of the tire.

The radius of curvature R of the rim engaging lip 98, in combination with the offset of the shaft 82 with respect to the threaded rod 20, assures that the rim engaging lip 98 will have its extremities in contact with the rim so long as R is less than or equal to the radius of the rim.

Figure 12:
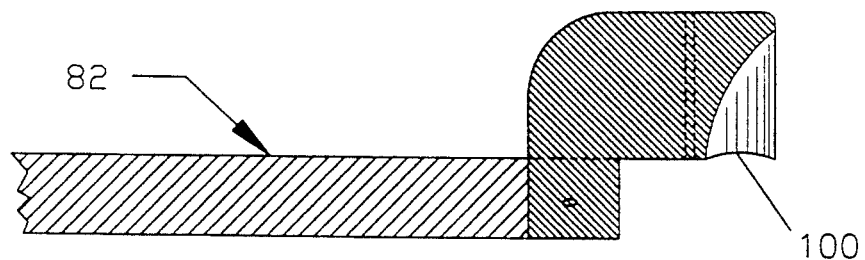
FIG. 12 is the cross section 12—12 of FIG. 10 and shows the configuration of the bead engaging groove.

A bead engaging groove 100, illustrated in FIG. 10 and 12 is provided which decreases in cross section as the distance, in a direction perpendicular to the central axis 84 of the shaft 82, increases. The bead engaging groove 100 has a path which slopes toward the rim engaging lip 98 as the distance from the engaging groove 100 to the shaft 82 increases. This path assists in directing the bead of the tire in the direction of the rim as the bead of the tire moves away from the shaft 82. While the '756 patent does teach the use of a lip engaging rim in combination with a groove, it neither teaches a radius to the lip engaging rim nor teaches a contoured bead engaging groove which will urge the bead onto the rim. FIG. 12 is a cross-section which further illustrates the contour of the bead engaging groove 100 as well as how the groove 100 slopes towards the rim engaging lip as the distance from the shaft 82 in cross-section.

Figure 13:
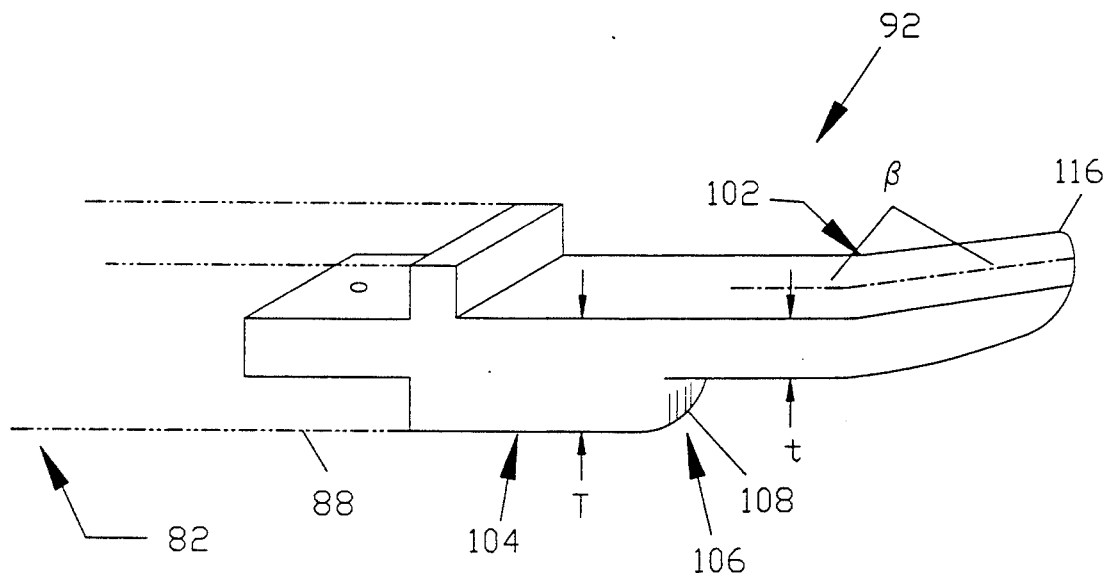
FIG. 13 is a perspective view of the tire stripping head of FIG. 8.

FIG. 13 shows a perspective view of the tire stripping head 92 and, in phantom lines, the second end 88 of the shaft 82. The tire stripping head 92 attaches to the second end 88 of the shaft 82 and has a tire stripping tip 102 and a tire stripping body 104. The tire stripping body 104 has a body thickness T. This thickness is greater than the end thickness t of the tire stripping tip 102.

A rim engaging step 106 results from the junction between the tire stripping body 104 and the tire stripping tip 102. The step 106 limits the length of the portion of the tire stripping tip 102 which projects into the tire, thereby limiting the likelihood of damage to a tube contained therein.

To further facilitate the stripping of the tire from the rim, it is preferred that a smooth curved riser 108 be provided to the step 106. The riser 108 is concave when viewed from the shaft 82. Having the riser 108 so configured will facilitate rocking of the step 106 on the rim and will aid in the advancement of the stripping tip.

While the '325 patent does show a stepped tip configuration, the square step would not provide a surface for rocking the tool around the rim to promote the stripping of the tire from the rim.

The tire stripping tip 102 has a first section 110 and a second section 112 (see FIG. 9) both of these sections preferably having the same thickness t. The second section 112 connects to the tire stripping body 104 and the first section 110 attaches to the second section 112 and terminates in a smooth curved end 116. The first section 110 and the second section 112 are positioned such that they have an included angle β of between about 140° and 160°. This angle tilts the stripping tip 102 away from the step 106. Having the stripping tip 102 so configured will keep the curved end 116 in close proximity to the tire and minimize the likelihood of damage to a tube contained therein. This configuration allows the tool to perform equally well on a wide range of rim sizes.

While the present invention has been described in terms of preferred embodiments, it should be understood that substitutions and changes may be made by one skilled in the art without departing from the spirit of the invention.

What is claim is:

1. A tire changing device for mounting and dismounting tires from a rim for use in combination with a bench having a bench top, comprising:
   a threaded rod;
   a sleeve which is slidably engaged by said threaded rod, said sleeve guiding said threaded rod from a below bench top position to an above bench top position wherein a portion of said threaded rod is above a bench top;
   means for coupling said sleeve to a bench;
   means for positioning and locking said threaded rod with respect to said sleeve in said above bench top position;
   a friction pad for placement on a bench top through which said rod passes;
   a hub restrainer through which said threaded rod passes; and
   a torque nut for engaging with said threaded rod.

2. The tire changing device of claim 1 further comprising:
   a spacer sleeve through which said threaded rod passes, said spacer being interposed between said hub restrainer and said torque nut.

3. The tire changer of claim 1 wherein said torque nut and said hub restrainer are an integral unit.

4. The tire changing device of claim 2 wherein said friction pad further comprises:
   a rigid substrate; and
   a resilient member attached to said rigid substrate.

5. The tire changer of claim 2 wherein said means for positioning and locking said threaded rod further comprises:
   a movable pin which engages a passage in said threaded rod; and
   a pair of sleeve holes defining a first sleeve hole and a second sleeve hole in said sleeve positioned such that when aligned with said passage in said threaded rod, a portion of said threaded rod is above a bench top, said pin removably engaging said first sleeve hole and said second sleeve hole.

6. The tire changer of claim 4 wherein said means for positioning and locking said threaded rod further comprises:
   a movable pin which engages a passage in said threaded rod; and
   a pair of sleeve holes defining a first sleeve hole and a second sleeve hole in said sleeve positioned such that when aligned with said passage in said threaded rod, a portion of said threaded rod is above a bench top, said movable pin removably engaging said first sleeve hole and said second sleeve hole.

7. The tire changing device of claim 6 further comprising:
   a stop which engages said threaded rod for retention of said movable pin in said passage in said threaded rod; and
   a slot in said sleeve communicating with said second sleeve hole.

8. The tire changing device of claim 1 wherein said torque nut further comprises:
  a base plate having a beveled opening for receiving said threaded rod; and
  tabs for tightening and loosening said torque nut.

9. The tire changing device of claim 1 wherein said torque nut further comprises:
  a base plate having a beveled opening for receiving said threaded rod; and
  tabs for tightening and loosening said torque nut.

10. The tire changing device of claim 9 wherein said base plate has a rectangular cross section, having a width W and a length L such that W is substantially less than L.

11. A tire changing device for mounting and dismounting tires from a rim for use in combination with a bench having a bench top, comprising:
  a threaded rod;
  a sleeve which is slidably engaged by said threaded rod, said sleeve guiding said threaded rod from a below bench top position to an above bench top position wherein a portion of said threaded rod is above a bench top;
  means for coupling said sleeve to a bench;
  a movable pin which engages a passage in said threaded rod; and
  a pair of sleeve holes defining a first sleeve hole and a second sleeve hole in said sleeve positioned such that when aligned with said passage in said threaded rod, a portion of said threaded rod is above a bench top, said movable pin removably engaging said first sleeve hole and said second sleeve hole;
  a friction pad for placement on a bench top through which said rod passes;
  a hub restrainer through which said threaded rod passes; and
  a torque nut for engaging with said threaded rod.

12. The tire changing device of claim 11 further comprising;
  a stop which engages said threaded rod for retention of said movable pin in said passage in said threaded rod; and a slot in said sleeve communicating with said second sleeve hole.

* * * * *